April 10, 1951  L. H. FEMONS  2,548,296
CONNECTING ROD ASSEMBLY

Filed April 12, 1948  2 Sheets-Sheet 1

INVENTOR
L.H.Femons

BY
ATTORNEYS

Patented Apr. 10, 1951

2,548,296

UNITED STATES PATENT OFFICE 2,548,296

CONNECTING ROD ASSEMBLY

Leon H. Femons, Stockton, Calif., assignor of one-half to Laura Femons, Stockton, Calif.

Application April 12, 1948, Serial No. 20,440

1 Claim. (Cl. 74—40)

This invention is directed to, and it is an object to provide, a novel connecting rod assembly for internal combustion engines.

Another object of the invention is to provide a connecting rod assembly, for internal combustion engines, which results in relatively great horse power output in relation to piston displacement.

An additional object of the invention is to provide a connecting rod assembly which causes the engine to run smoothly; permits of low idling speed; and assures of quick pick-up when desired.

A further object of the invention is to provide a connecting rod assembly, wherein the arrangement is such as to minimize side thrust by the piston on the cylinder walls, reducing wear on such parts; the connecting rod reciprocating in substantially a straight path at all times.

It is also an object to provide a connecting rod assembly which includes a bellcrank lever and a link arm in novel combination; such combination having a three-point connection between the connecting rod, the crank shaft, and the crank case.

A further object of the invention is to provide a connecting rod assembly whose design is such that the crank shaft can be laterally offset relative to the cylinder, whereby to give an advantageous down-thrust to the crank from the connecting rod through the novel arrangement of interconnecting parts.

A further object of the invention is to provide a practical and reliable connecting rod assembly, and yet one which will be exceedingly effective for the purpose for which it is designed.

These objects are accomplished by means of such structure and relative arrangement of parts as will fully appear by a perusal of the following specification and claim.

Figure 1:
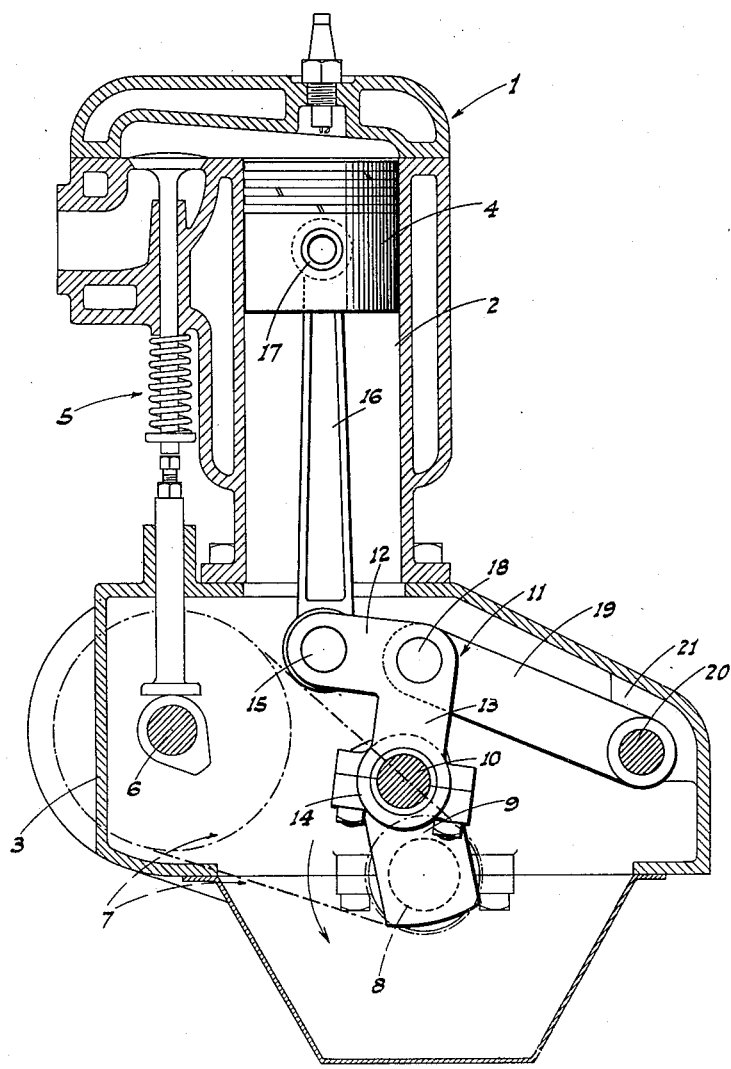
Fig. 1 is a transverse section of a one-cylinder internal combustion engine embodying the novel connecting rod assembly; the parts being shown in the position occupied thereby at the beginning of a power stroke.
Figure 2:
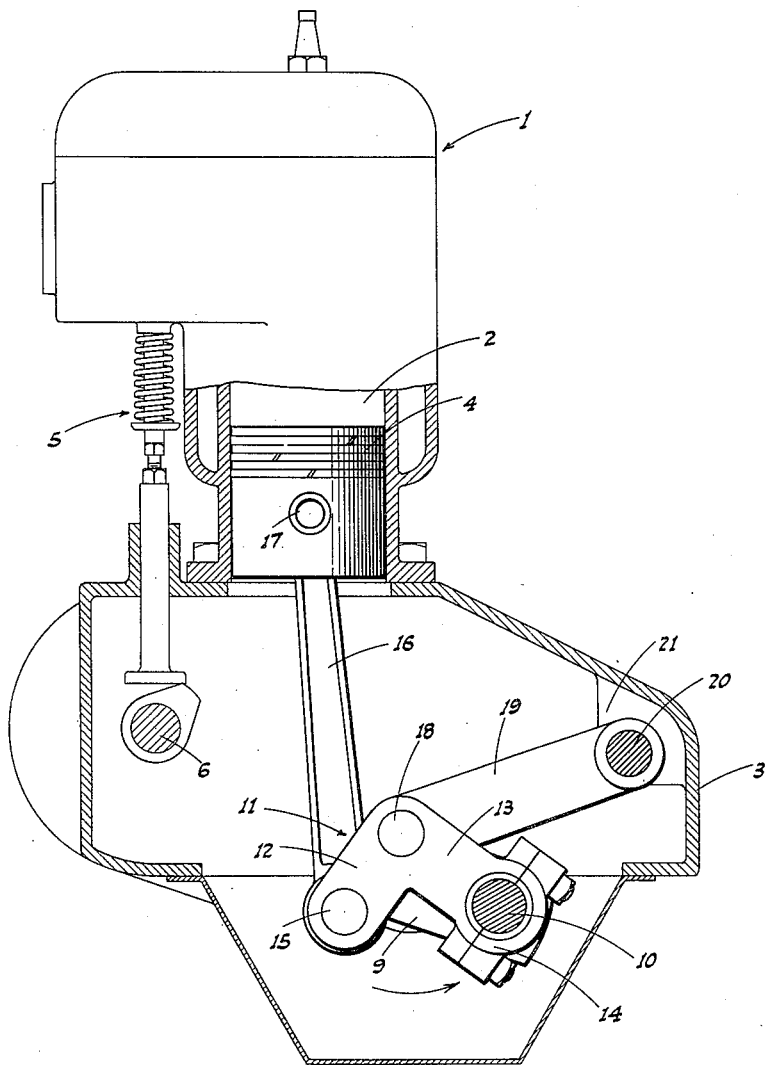
Fig. 2 is a similar view, but shows the position of the parts at the end of a power stroke.

Referring now more particularly to the characters of reference on the drawings, the numeral 1 indicates generally a one-cylinder internal combustion engine, although obviously the invention may be used in multi-cylinder engines.

The engine 1 includes, as conventional parts, a cylinder 2 mounted atop a crank case 3; there being a piston 4 reciprocable in said cylinder 2. Additionally, the engine 1 includes a valve unit 5 actuated by a cam shaft 6 rotated by a drive, indicated generally at 7.

The crank shaft of the engine is indicated at 8, and the cam shaft drive 7 is coupled to said crank shaft.

In the above described engine there is embodied the novel connecting rod assembly, as follows:

At the outset it should be noted that the crank shaft 8 is offset laterally from the axis of the cylinder 2; such crank shaft 8 including a crank 9 having a crank pin 10.

The numeral 11 indicates a bellcrank lever whose legs are identified at 12 and 13.

The leg 12 of the bellcrank lever 11 is coupled, at its free end, to the crank pin by a bearing 14, and extends from said crank pin radially.

The other leg 13 of the bellcrank lever 11 extends at right angles to the leg 12, and said leg 13 is coupled, at its free end, by a cross pin 15 to the lower end of a rigid connecting rod 16 which extends upwardly into the cylinder 2, and is there secured in the piston 4 by means of a conventional wrist pin 17.

The direction of rotation of the crank shaft is indicated by an arrow in each figure of the drawings, and it should be noted that the leg 13 of the bellcrank lever 11 projects from the leg 12 generally in the direction of said rotation. The legs 12 and 13 of the bellcrank lever 11 are of substantially the same length.

The bellcrank lever 11 is pivotally connected, at its elbow, by means of a cross pin 18 with one end or a rigid link arm 19. The link arm 19 extends from the bellcrank lever 11 in a direction generally opposite the leg 13, and at its outer end said link arm is pivotally mounted by a cross pin 20 secured in connection with a boss 21 on the adjacent side of the crankcase 3.

With the connecting rod assembly above described a very beneficial and effective leverage or thrust is attained upon the down stroke of the piston 4 and connecting rod 16, by reason of the fact that the crank shaft 8 is laterally offset relative to the axis of the cylinder, as shown and described.

Additionally, the combination of the bellcrank lever 11 and link arm 19, as mounted with the described three-point connection, results in the crankshaft 8 turning through approximately 240° on the power stroke and approximately 120° on the exhaust stroke. In other words, the piston 4 travels twice as fast on the exhaust stroke as it does on the power stroke; this being a beneficial feature in an internal combustion engine. With the arrangement the engine has a low idling speed and quick pick-up, with maximum power in relation to its displacement.

The path of travel of the respective parts of the connecting rod assembly will be obvious, but it is of importance that the connecting rod 16 travels generally in a straight path with little swinging motion about the axis of the wrist pin 17. The result is that wear between the piston 4 and cylinder 2 is minimized.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as will fully appear by a perusal of the following specification and claim.

Having thus described the invention, the following is claimed as new and useful, and upon which Letters Patent are desired:

A connecting rod assembly for an internal combustion engine which includes a crank case, a cylinder, a piston in the cylinder, a connecting rod extending from the piston into the crank case, a crank shaft in the crank case, and a crank on the crank shaft and including a crank pin: such assembly including a right angle bell crank, a link arm pivotally connected between the crank case and elbow of the bell crank, one leg of the bell crank being journaled on said crank pin and projecting radially and substantially vertically therefrom when the piston is positioned at the point of commencement of its power stroke, the other leg of the bell crank then projecting at right angles to the first leg and in the direction of rotation of the crank and being connected to the lower end of the connecting rod.

LEON H. FEMONS.

REFERENCES CITED

The following references are of record in the file of this patent:

UNITED STATES PATENTS

| Number | Name | Date |
|---|---|---|
| 308,653 | Clemson | Dec. 2, 1884 |
| 1,207,003 | Elliott | Dec. 5, 1916 |
| 1,597,080 | Lewis | Aug. 24, 1926 |
| 2,005,000 | Miller | June 18, 1935 |